United States Patent
Buttau et al.

(10) Patent No.: US 7,371,036 B2
(45) Date of Patent: May 13, 2008

(54) TOOL HOLDING DEVICE AND METHOD FOR POSITIONING A TOOL

(75) Inventors: Dieter Buttau, Ingersheim (DE); Felix Thiel, Heilbronn (DE)

(73) Assignee: E. Zoller GmbH & Co. KG Einstell-Und Messgeräte, Freiberg/Neckar (DE)

(*) Notice: Subject to any disclaimer, the term of this patent is extended or adjusted under 35 U.S.C. 154(b) by 322 days.

(21) Appl. No.: 10/536,957

(22) PCT Filed: Oct. 20, 2003

(86) PCT No.: PCT/EP03/11592

§ 371 (c)(1), (2), (4) Date: May 31, 2005

(87) PCT Pub. No.: WO2004/052591

PCT Pub. Date: Jun. 24, 2004

(65) Prior Publication Data

US 2006/0078396 A1    Apr. 13, 2006

(30) Foreign Application Priority Data

Dec. 11, 2002   (DE) ............................... 102 58 055

(51) Int. Cl.
*B23C 3/00* (2006.01)
*B23Q 17/22* (2006.01)

(52) U.S. Cl. .................. 409/234; 408/156; 279/4.03

(58) Field of Classification Search ............... 409/234, 409/232; 408/153, 154, 155, 156, 173, 178, 408/239 A; 279/123, 121, 125, 4.03, 132, 279/133, 49, 52, 53, 54, 55, 56, 59; 82/159, 82/160; 29/447
See application file for complete search history.

(56) References Cited

U.S. PATENT DOCUMENTS 3,365,204 A * 1/1968 Milton et al. ............... 279/51
3,504,442 A   4/1970 Allen
3,652,100 A * 3/1972 Baturka ....................... 279/51
3,677,559 A * 7/1972 Andre et al. ............... 279/4.03
3,905,609 A * 9/1975 Sussman ...................... 279/20

(Continued)

OTHER PUBLICATIONS

Office communication issued in connection with the corresponding European patent application No. 03 758 023.0-2302 dated Mar. 30, 2006.

*Primary Examiner*—Dana Ross
(74) *Attorney, Agent, or Firm*—Posz Law Group, PLC

(57) ABSTRACT

Disclosed is a tool holding device (22, 50, 58) for retaining a tool (24) on a tool chuck (20). Said tool holding device (22, 50, 58) comprises a tool-accommodating area (32, 52, 66) for at least partly receiving the tool (24), a connecting area (26, 54 62) to be arranged on the tool chuck (20), and a positioning opening (48) through which a positioning means (18) can be placed against the tool (24) that is disposed at least in part in the tool-accommodating area (32, 52, 66)

12 Claims, 6 Drawing Sheets

U.S. PATENT DOCUMENTS

Figure 1:
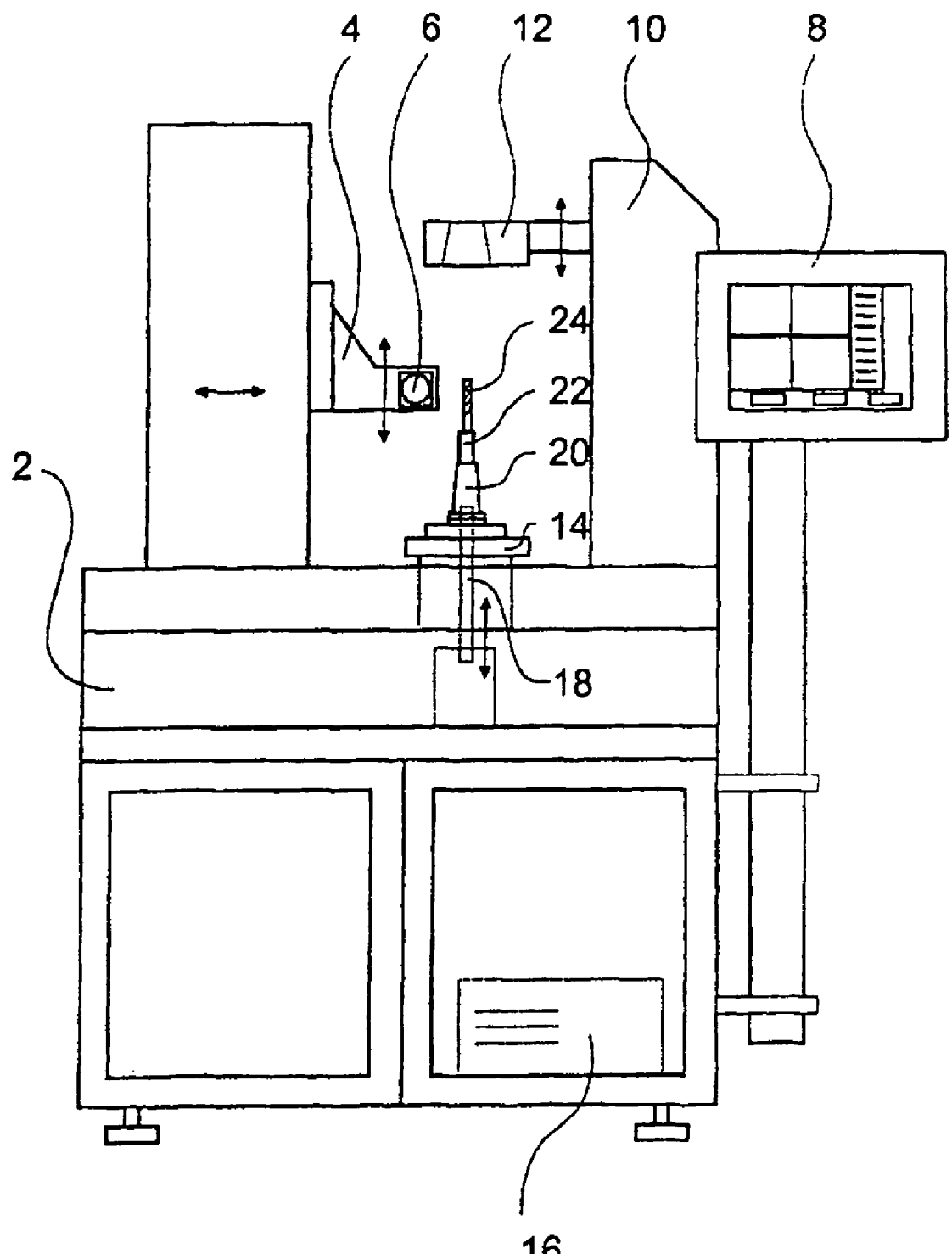

| | | | |
|---|---|---|---|
| 4,519,734 A * | 5/1985 | Mitchell et al. | 409/231 |
| 5,030,048 A * | 7/1991 | Massa | 409/234 |
| 5,127,780 A * | 7/1992 | Massa | 409/234 |
| 5,265,990 A * | 11/1993 | Kuban | 409/232 |
| 5,280,671 A * | 1/1994 | Marquart | 29/447 |
| 5,286,042 A * | 2/1994 | Laube | 279/133 |
| 5,311,654 A * | 5/1994 | Cook | 29/447 |
| 5,340,127 A * | 8/1994 | Martin | 279/20 |
| 5,567,093 A * | 10/1996 | Richmond | 409/136 |
| 5,582,494 A * | 12/1996 | Cook | 409/234 |
| 5,716,173 A * | 2/1998 | Matsumoto | 408/239 A |
| 5,873,687 A * | 2/1999 | Watanabe | 409/234 |
| 5,957,636 A * | 9/1999 | Boisvert | 409/131 |
| 5,984,595 A * | 11/1999 | Mizoguchi | 408/57 |
| 5,992,860 A * | 11/1999 | Marquart | 279/102 |
| 6,131,916 A * | 10/2000 | Toda | 279/9.1 |
| 6,135,679 A * | 10/2000 | Kazda | 408/57 |
| 6,209,886 B1 * | 4/2001 | Estes et al. | 279/50 |
| 6,260,858 B1 * | 7/2001 | DeLucia | 279/102 |
| 6,371,705 B1 * | 4/2002 | Gaudreau | 409/234 |
| 6,375,398 B1 * | 4/2002 | Gaudreau et al. | 409/232 |
| 6,595,528 B2 * | 7/2003 | Voss | 279/102 |
| 6,701,597 B2 * | 3/2004 | Voss et al. | 29/407.05 |
| 6,824,337 B2 * | 11/2004 | Pentz et al. | 409/132 |
| 6,857,177 B2 * | 2/2005 | Taylor | 29/447 |
| 7,134,175 B2 * | 11/2006 | Flick | 29/407.09 |
| 7,137,185 B2 * | 11/2006 | Voss et al. | 29/447 |
| 7,165,923 B2 * | 1/2007 | Matsumoto et al. | 409/234 |
| 2001/0042295 A1 | 11/2001 | Voss et al. | |
| 2005/0135893 A1* | 6/2005 | Voss et al. | 409/234 |

\* cited by examiner

TOOL HOLDING DEVICE AND METHOD FOR POSITIONING A TOOL

PRIOR ART

The invention relates to a tool-holding device and a method of positioning a tool.

For the exact machining of a workpiece, in particular with a multispindle machine tool, it is advisable to clamp the cutting tools in each case in an exact position in the tool chucks of the spindles. For the exact positioning of a tool in a tool chuck, EP 1 155 765 A1 has disclosed a method and a tool chuck in which the tool is held in a small supporting opening and calibrating and measuring operations can be carried out on the tool before the tool is fastened in the tool chuck. In this case, however, exact alignment of the tool with the locating opening of the tool chuck can only be maintained to a moderate degree, so that there is the risk of an imprecise tool measurement, in particular in the case of long tools and/or tools tapering to a point.

The object of the invention is therefore to specify a tool-holding device and a method of positioning a tool in a tool chuck, with which method the tool can be positioned in a tool chuck with a high degree of accuracy.

This object is achieved according to the invention by the features of the independent patent claims.

ADVANTAGES OF THE INVENTION

With regard to the tool-holding device, a tool-holding device for holding a tool on a tool chuck is proposed, the tool-holding device comprising a tool-locating region for at least partly locating the tool, a connecting region for arranging on the tool chuck, and a positioning opening, through which a positioning means can be placed against the tool arranged at least partly in the tool-locating region. A supporting opening in the tool chuck can be dispensed with, as a result of which the tool chuck can be kept compact. In addition, the tool-holding device can be separated from the tool chuck and therefore, without having to interfere with the configuration and the dimensioning of the tool chuck, can be adapted for the exact holding of the tool relative to the tool chuck. If the tool is not positioned in the tool chuck in such a way that it is exactly in alignment with the tool chuck, this leads to incorrect determination of the axial length of the tool when measuring the tool at angular cutting edges of the tool. This applies in particular in the case of very long tools. Even slight angularity of the cutting edge, an error caused by manual focussing of an optical measuring unit, or the wobbling of the tool directly affect the measuring accuracy of the axial length. A tool-holding device can be arranged in alignment on the tool chuck with very high accuracy. In addition, it can be adapted to the shank of the tool in such a way that the tool is likewise held in the tool-holding device in alignment with the axis of the tool chuck. Measuring errors resulting from radial positioning inaccuracies are therefore largely avoided when measuring, for example, very long tools or angular characteristic elements of the tool, such as a cutting edge for example.

Due to the ease with which the positioning means can be placed against the tool, the position of the tool can be additionally detected with a high degree of accuracy. The position, thus determined, of the tool can be used for positioning the positioning means in such a way that the tool, when bearing against the positioning means, is arranged in the tool chuck in the desired position. In addition, the ease with which the positioning means can be placed directly against the tool ensures that, during the measurement for the pre-positioning and when the tool is placed on the positioning means before a fastening operation, e.g. by shrink fitting, the identical stop location and the identical stop are used. This is especially advantageous in the case of tools having internal cooling, which have an inner passage in the tool interior and therefore can only be positioned by a stop with difficulty.

The expression "tool chuck" refers to any device which is provided for retaining the tool during an operation of the tool on a workpiece. In particular, this refers to a shrink-fit chuck for the thermal shrink fitting of the tool. The tool-locating region preferably serves to locate the shank of the tool. The tool-holding device is arranged with the connecting region on the tool chuck. Such an arrangement refers to the fact that said tool-holding device and said tool chuck are brought together in contact with one another, for example placed one on top of the other, or are connected in a positive-locking or frictional manner. The connecting region may also be at least partly arranged in the tool chuck. The positioning opening is expediently arranged in the connecting region.

The tool-locating region, when the tool chuck is arranged in the connecting region, is intended for holding the tool in alignment with a locating opening of the tool chuck. In this way, the tool can be kept oriented outside the tool chuck in the way it is held in the tool chuck in the fastened state. Measurement of the tool can be carried out in a simple manner in this way.

A simple arrangement of the connecting region in the tool chuck can be achieved by the connecting region having a shank for arranging in a locating opening of the tool chuck. The shank can be inserted into the tool chuck and can expediently be positioned exactly in the locating opening.

Very exact orientation and an arrangement of the tool in the tool-locating region expediently free of play can be achieved by a holding element provided for the elastic deformation being arranged in the tool-locating region. In an especially simple manner, such a holding element may comprise an O-ring, other elastic means which are provided for bearing against the tool and for holding the same also being conceivable. In a similarly advantageous manner, a holding element provided for the elastic deformation is arranged in the connecting region, as a result of which the connecting region, which is designed as a shank for example, can be arranged in a precise position and expediently free of play on the tool chuck, this also referring to an at least partial arrangement in the tool chuck.

A further advantage can be achieved if a movably mounted holding element is arranged in the tool-locating region. Due to the movable mounting of the holding element, a tool can be inserted in an especially simple manner into the tool-locating region, designed as a tool-locating opening for example, and sliding friction during the insertion of the tool can be at least largely avoided. In a similarly advantageous manner, the movably mounted holding element is arranged in the connecting region, a factor which is advantageous with regard to the mounting of the connecting region on the tool chuck. The movably mounted holding element may be a rolling element, in particular a ball or a rolling-element cage, in particular a ball cage.

The holding element is advantageously a rolling-element cage, for example a ball cage or a rolling cage, other forms of rolling elements also being conceivable. In this way, an especially simple arrangement of the holding element in the connecting region or in the tool-locating region can be achieved.

An especially advantageous arrangement of the connecting region on the tool chuck can be achieved if the connecting region has an inner wall for arranging around an outer wall of the tool chuck. The tool-holding device can be put onto the tool chuck with the connecting region, in which case, in an expedient tapered design of the outer wall of the tool chuck, canting of the connecting region on the outer wall can be avoided. In this way, the tool-holding device can be arranged free of play and thus in an exact position on the tool chuck. This advantage is achieved in an especially effective manner if the inner wall is of tapered design.

With regard to the method, a method of positioning a tool in a tool chuck is proposed in which a tool-holding device is arranged on the tool chuck and the tool is held by the tool-holding device, and a characteristic element of the tool is scanned for positioning a positioning means, a force being applied to the tool by the positioning means through a positioning opening in the tool-holding device. As described above, the tool can be held very accurately by the tool-holding device in a desired orientation on the tool chuck and the tool can be thus measured. By the force being applied to the tool, for example by the positioning means being placed directly or indirectly against the tool, the positioning means, without calibration, can then be brought into a position in which the tool placed against the positioning means is located very precisely in a desired position.

The tool-holding device is arranged on the tool chuck, in which case it can also be arranged, for example inserted, partly in the tool chuck. The characteristic element may be a tip of the tool or an edge, cutting edge, flank, side, contour, envelope curve or another element of the tool that is important during the machining of a workpiece. The scanning of the characteristic element of the tool may be effected mechanically, for example by applying a measuring element, or in a non-contact manner, for example optically by recording an image of the element.

The force on the tool is advantageously maintained during the measuring of the characteristic element. In this way, a position reference between the characteristic element and the positioning means can be retained during the measurement, as a result of which exact positioning of the tool in the tool chuck can be achieved.

A further advantage of the invention is achieved by the positioning means being placed against the tool before the measuring of the characteristic element, and by the tool being scanned when said positioning means is placed against it. By the positioning means being placed against the tool, and by the force flow which takes place as a result, the tool can be moved by a short distance. This movement can be detected by the scanning and can serve as a trigger for starting the measurement of the characteristic element. The scanning may be effected mechanically, or optically in a non-contact manner, electrical scanning, for example by a capacitive measurement, also being conceivable. The characteristic element is preferably scanned.

The placing of the positioning means against the tool expediently causes the tool to move, and the movement is expediently used as a trigger for stopping the movement of the positioning means. As a result, the positioning means can be moved from its unknown position in a simple manner until the movement of the tool is recorded by the force flow which takes place. Even without knowledge of the position of the positioning means, a measuring operation can be started and exact positioning of the tool in the tool chuck can be achieved.

A reliably exact measurement of the characteristic element can be achieved by the tool being lifted in the tool-holding device by the positioning means before the measuring of the characteristic element and by it remaining lifted during the measuring.

An automated and thus cost-effective sequence of the measuring of the characteristic element can be achieved by an optical measuring system being focussed on a predetermined point, by the optical measuring system, if the tool is absent or visible in the field of view of the optical measuring system, being brought closer to or respectively moved away from the tool chuck in the axial direction of a tool-locating region of the tool-holding device, and, after the characteristic element appears in the field of view, by its actual position being determined and by the force then being applied to the tool. Due to such an automatic search run of the optical measuring system, for example a camera, in combination with a lighting element, manual setting of the optical measuring system to the characteristic element can be dispensed with. The predetermined point preferably lies in the axial direction of the characteristic element of the tool. For example, the point may be arranged at a visible edge of the shank of the tool, and the optical measuring system may be moved in such a way that the field of view travels along the visible edge of the tool up to the characteristic element.

After the application of the force, the actual position is expediently measured again for determining the desired position of the positioning means. Due to the initial determination of the actual position of the characteristic element, a movement of the tool by the positioning means being placed against the tool can be recorded, namely by the characteristic element being moved out of the initial actual position. To determine the desired position of the positioning means, the actual position of the characteristic element is measured again in order to achieve exact positioning of the tool in the tool chuck.

The tool and the tool-holding device are advantageously separated from one another after the measuring and the tool is advantageously inserted into the tool chuck. Due to this separation of the tool-holding device and the tool chuck fastened in the tool, the tool chuck can be of especially simple design, for example in the form of a commercially available standard tool chuck.

DRAWING

Further advantages follow from the description of the drawing below. An exemplary embodiment of the invention is shown in the drawing. The drawing, the description and the claims contain numerous features in combination. The person skilled in the art will also expediently consider the features individually and form appropriate further combinations therefrom.

Figure 2:
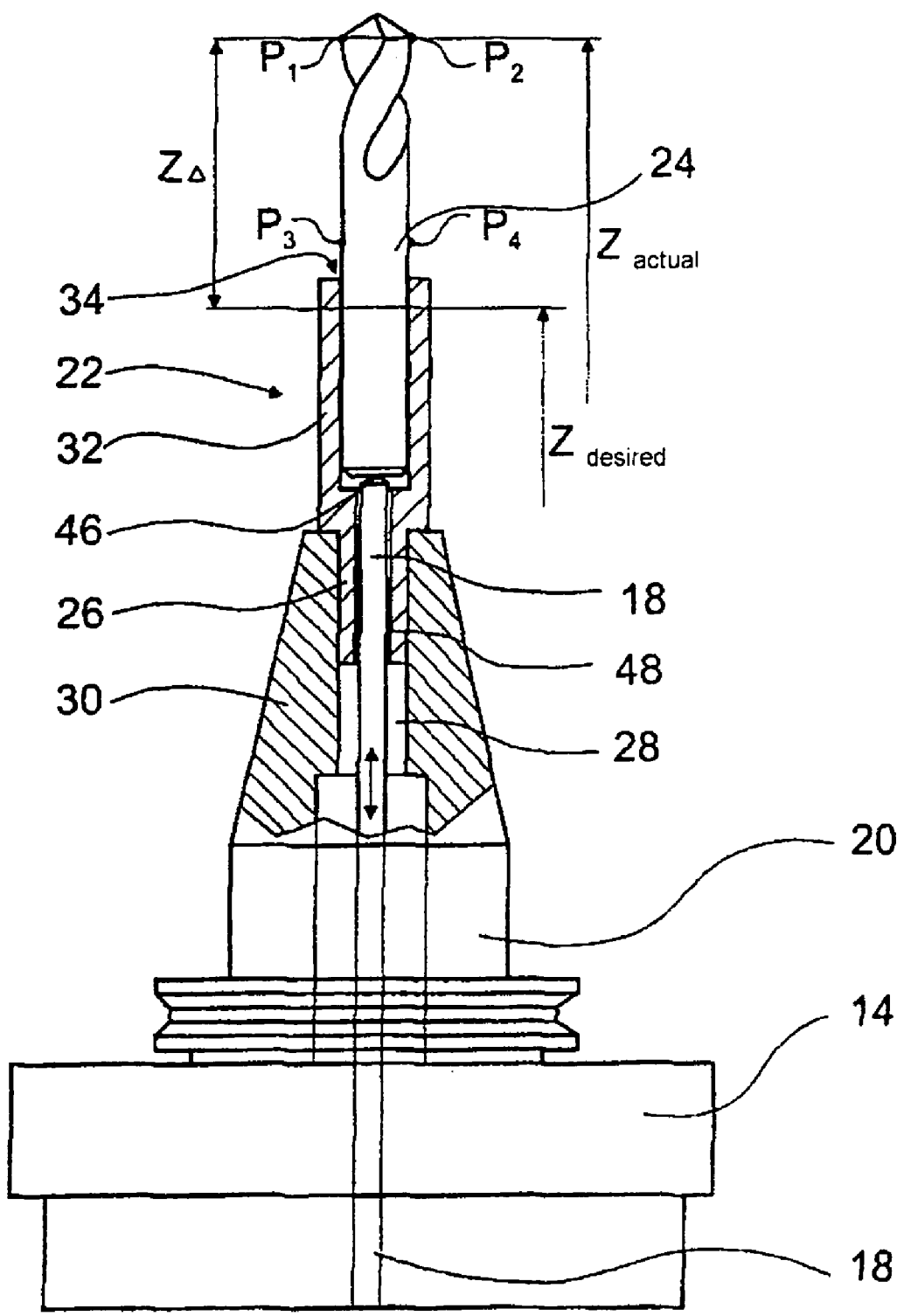
Figure 3:
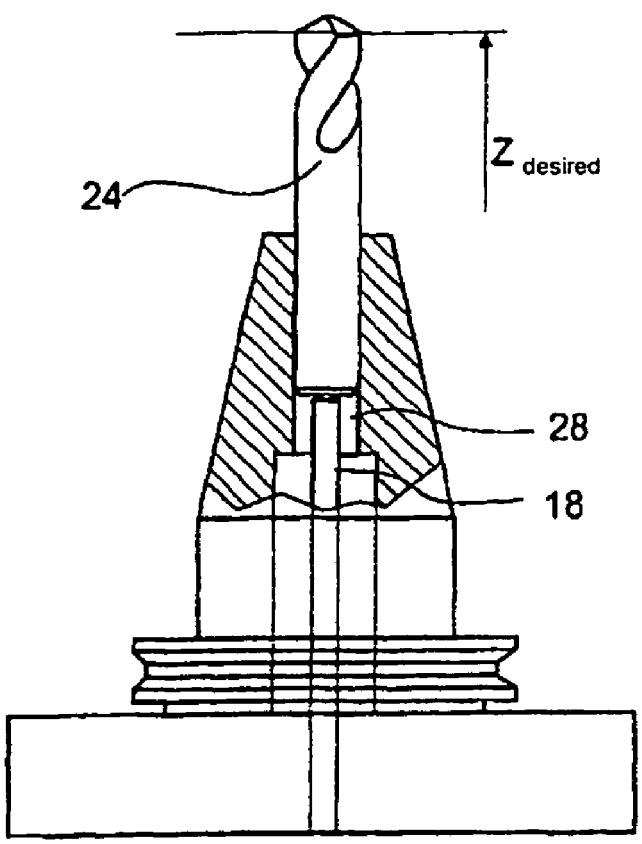
Figure 4:
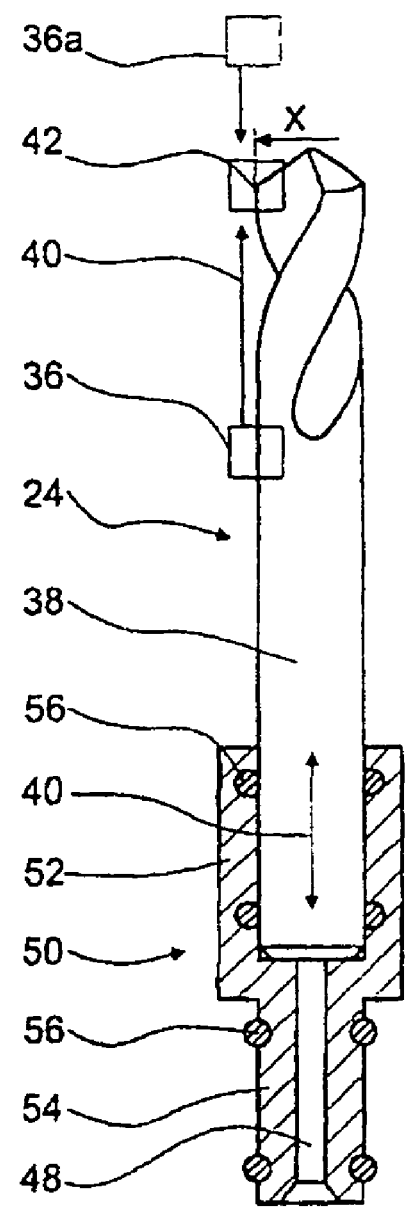
Figure 5:
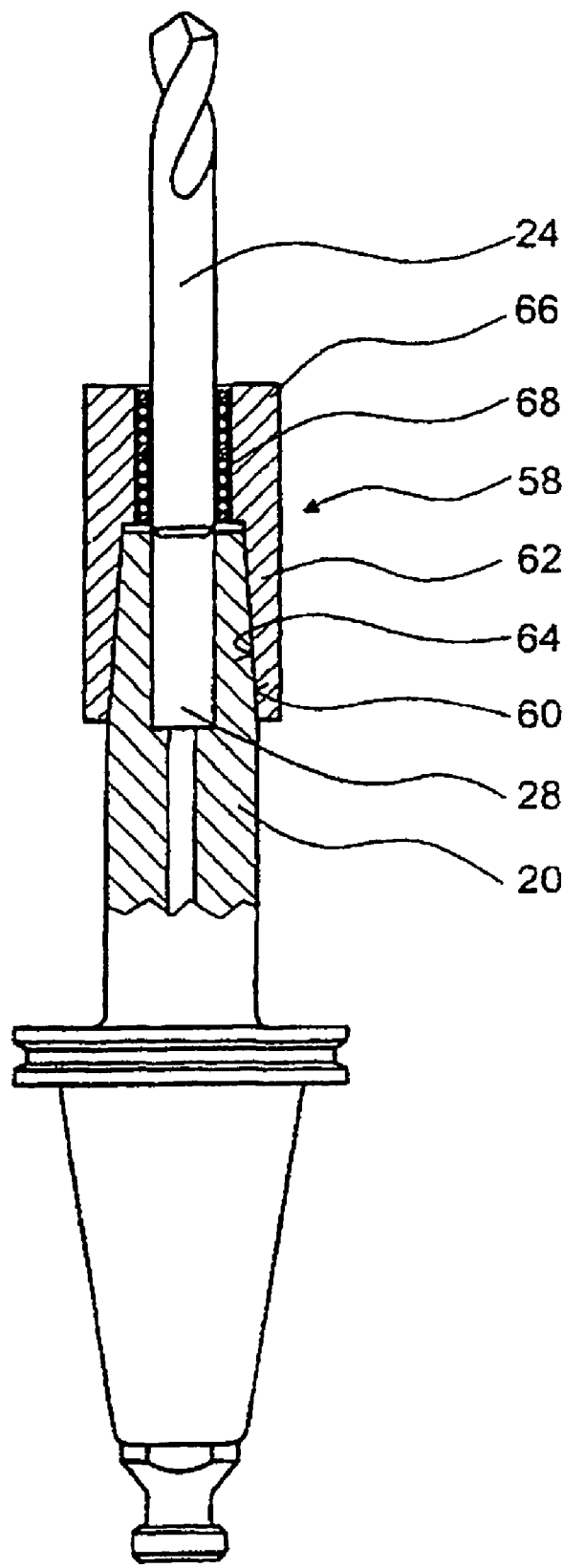
Figure 6:
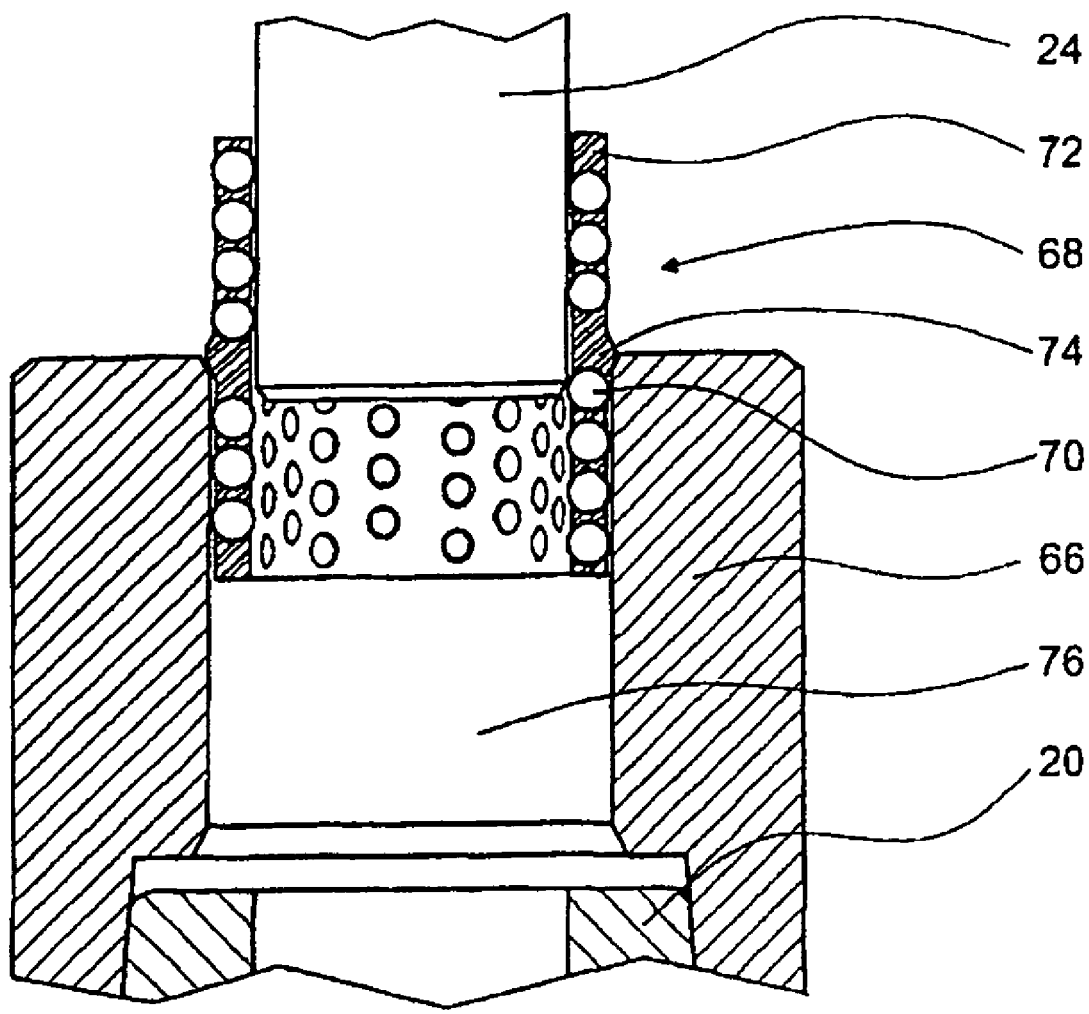
Figure 7:
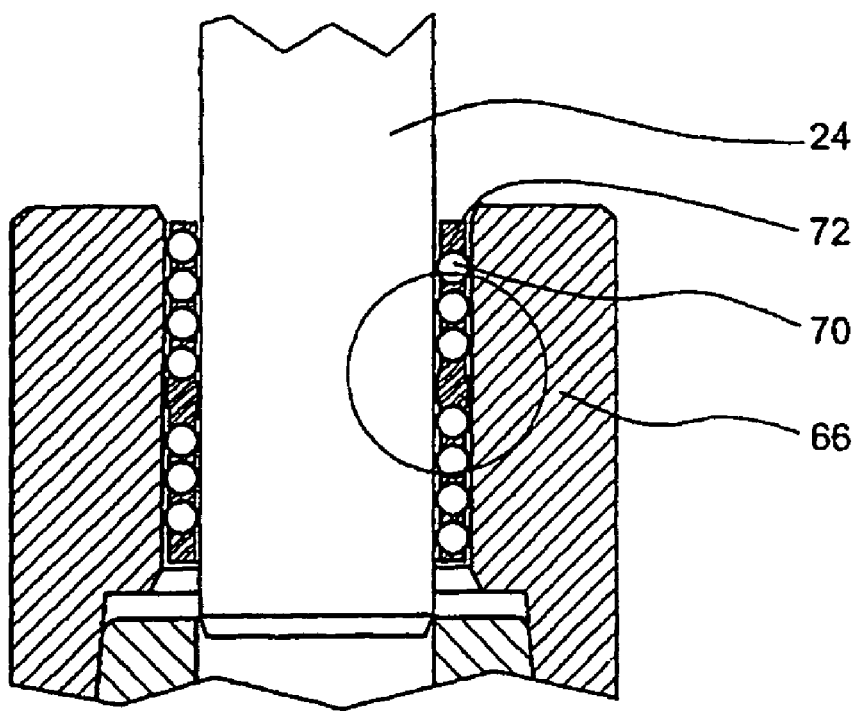
Figure 8:
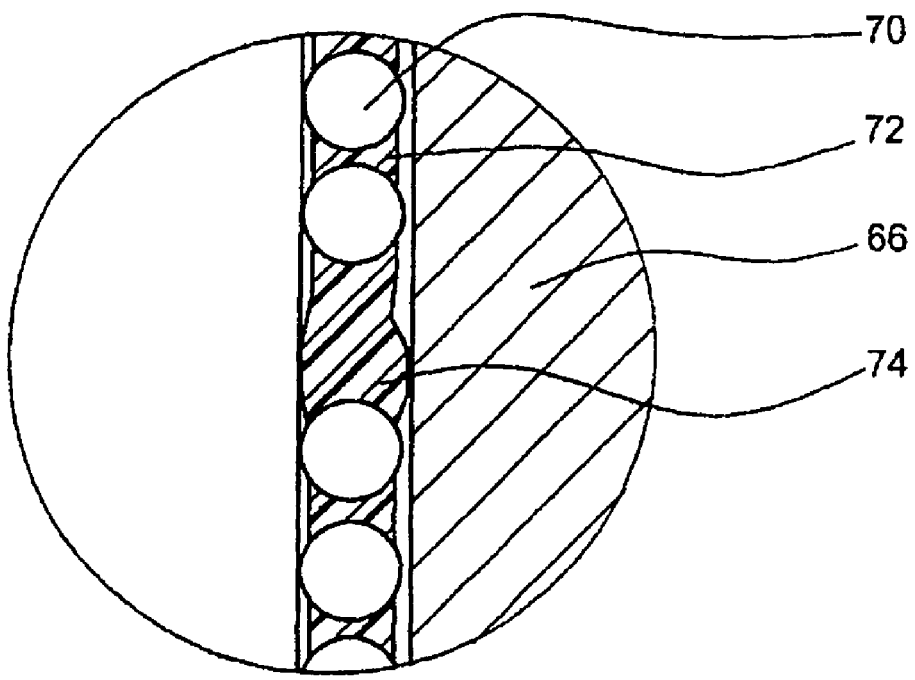

In the drawing:

FIG. 1 shows a schematic illustration of a tool setting and measuring apparatus, FIG. 2 shows a section through a tool chuck with a positioning means and a tool-holding device, FIG. 3 shows the tool chuck from FIG. 2 with positioned tool, FIG. 4 shows an alternative tool-holding device with inserted tool, FIG. 5 shows a further tool chuck with a mounted tool-holding device in a sectioned illustration, FIG. 6 shows the tool-holding device from FIG. 5 with a holding element, during the process for inserting the tool, FIG. 7 shows the tool inserted into the holding element, and FIG. 8 shows a detail of the holding element from FIG. 7.

The setting and measuring apparatus 2 shown in FIG. 1 comprises an optical-system carrier 4, a camera system with an optical measuring system 6 in the form of a camera, a control unit 8, an induction slide 10, an induction coil 12 and a tool-mounting spindle 14. In addition, the setting and measuring apparatus 2 has an evaluating unit 16 and an automatic length-setting and stop system with a positioning means 18. Fastened in the tool-mounting spindle 14 is a tool chuck 20, into which a tool-holding device 22 is inserted. A tool 24 designed as a shank-type tool is inserted into the tool-holding device 22. The elements mentioned can be moved in accordance with the arrows shown.

A method of fastening the tool 24 in the tool chuck 20 is described below with reference to FIGS. 1 to 4. The tool chuck 20 is inserted into the mounting spindle 14 and preferably clamped in place there. After that, the tool-holding device 22 is inserted with a connecting region 26, shaped as a shank, into a locating opening 28 of the tool chuck 20. The connecting region 26 serves to arrange the tool-holding device 22 on the tool chuck 20 and is ground in the shank in such a way that it can be inserted into the locating opening 28 in a sliding manner and virtually free of play without heating a locating region 30 of the tool chuck 20. Above the connecting region 26, the tool-holding device 22 has a tool-locating region 32, or tool-accommodating region, with a tool-locating opening 34, which is designed in such a way that the tool 24 can be inserted virtually free of play. In the process, the tool 24 can be pressed into the tool-locating opening 34 until it bears with its shank end against the bottom of the tool-locating opening 34. The tool-locating region 32, with tool chuck 20 arranged in the connecting region 26, is intended for holding the tool 24 in alignment with the locating opening 28 of the tool chuck 20.

After the tool 24 has been inserted into the tool-holding device 22, a data record assigned to the tool 24 is loaded into the evaluating unit 16. At this instant, the type of tool 24 involved and the desired position $Z_{desired}$ at which it is to be located in the tool chuck 20 and then shrunk in place is known to the evaluating unit 16. A measuring sequence by means of the control unit 8 is now started by an operator, as a result of which the optical measuring system 6, with its field of view 36, is focussed on a predetermined point. The point lies, for example, at a predetermined height above a reference point of the tool chuck 20 and on a visible edge of a cylindrical shank 38 of the tool 24. The tool 24 is visible in the field of view 36 of the optical measuring system 6. This visibility is recorded by the evaluating unit 16 and the optical measuring system 6 is moved in such a way that the field of view 36 is moved away from the tool chuck 20 in the axial direction 40—that is to say it is moved upward. Finally, a characteristic element 42 of the tool 24, for example a cutting edge, appears in the field of view 36, as a result of which the characteristic element 42 is optically scanned. The characteristic element 42 is detected by the evaluating unit 16, the movement of the optical measuring system 6 is stopped, and the actual position $Z_{actual}$ of the characteristic element 42 is determined. In this case, the actual position $Z_{actual}$ relates to the position of the characteristic element 42 relative to a fixed reference point on the tool chuck 20. It is likewise readily possible to direct a field of view 36a of the optical measuring system 6 toward a predetermined point which lies above the tool 24, so that the tool 24 is absent in the field of view 36a. In this case, a downward movement of the optical measuring system 6 in the axial direction 40 is started by the evaluating unit 16, and the optical measuring system 6 is brought closer to the tool chuck 20 until the characteristic element 42 appears in the field of view 36a of the optical measuring system 6.

After completion of the determination of the actual position $Z_{actual}$ of the characteristic element 42, the positioning means 18 in the form of a rod-like plunger is moved upward from a rest position by a drive (not shown). In the process, the positioning means 18 is guided with a top stop 46 through a positioning opening 48 in the connecting region 26 of the tool-holding device 22, to be precise until the stop 46 abuts against the shank of the tool 24. By this placing of the positioning means 18 against the tool 24, the tool 24 is lifted slightly, for example by a few hundredths of a millimeter up to a few millimeters.

During the raising of the positioning means 18, the characteristic element 42 is scanned by the optical measuring system 6, and the image of the characteristic element 42 appearing in the field of view 36, 36a is regularly checked for a movement by the evaluating unit 16. The movement of the characteristic element 42, for example by a few tenths of a millimeter, caused by the abutting of the stop 46 against the tool shank, is detected by the evaluating unit 16 by means of the optical measuring system 6 and is used as a trigger for stopping the movement of the positioning means 18. The tool 24, held by the tool-locating region 32, then rests on the positioning means 18.

The characteristic element 42 is now again measured for its actual position $Z_{actual}$, and, in combination with the stored desired position $Z_{desired}$ of the charateristic element 42, a desired position of the positioning means 18 or a displacement distance $Z_A$ into this desired position is determined. The positioning means 18 is now moved downward by this displacement distance $Z_A$ and is held there in a waiting position.

After that, the tool 24 can be removed from the tool-holding device 22 and the tool-holding device 22 can be removed from the tool chuck 20, and the heating of the locating region 30 of the tool chuck 20 and thus the operation for shrink fitting the tool 24 can be started by moving the induction coil 12 into position manually or automatically. After sufficient heating of the locating region 30, the tool 24 is inserted into the locating opening 28 of the tool chuck 20 by an operator or automatically by a robot, in the course of which it is offered to the already pre-positioned positioning means 18 (FIG. 3). The characteristic element 42 is now located in the desired position $Z_{desired}$. The complete tool shrunk in place, consisting of tool chuck 20 and tool 24, is then cooled with air, cooling adapters or water-flushed cooling bells. The shrink-fitting operation is ended, and the tool 24 can be measured again in the cooled state. The positioning means 18 can be retracted into an initial state.

On multiple-edged tools, first of all the largest of all the cutting edges can preferably be traced and this cutting edge can then be used for the measuring and setting. A further advantage is that the tool-holding device 22 may be designed with such a length that both the shank length of the tool 24 itself and the insertion depth into the tool chuck 20 can be optimally dimensioned. Thus a wobbling error during the measurement is largely avoided. On account of the simple and inexpensive design, individual tool-holding devices 22 may in principle also be provided for one and the same tool type (shank diameter) for special tools or for different shank tolerances.

For the at least partial correction of any wobbling of the tool 24 in the tool-holding device 22, it is additionally possible to determine the outer contour of the tool 24 at four points $P_1$, $P_2$, $P_3$ and $P_4$, for example by means of the optical measuring system 6, and to determine the theoretical center axis of the tool 24 therefrom. This center axis is the straight connecting line from a first calculated center point which lies between the points $P_1$ and $P_2$ to a second calculated center point which lies between the points $P_3$ and $P_4$. This theoretical center axis can be included in the determination of the position of the characteristic element 42. Such a determination of the theoretical center axis is especially appropriate in straight-fluted tools and in tools in which an outer contour of the shank can be measured as described above.

An alternative tool-holding device 50 is shown in FIG. 4. A holding element 56 in the form of O-rings is arranged in both the tool-locating region 52, or tool-accommodating region, and the connecting region 54, these O-rings ensuring that the tool 24 is retained free of play in the tool-locating region 52 and respectively that the connecting region 54 is retained free of play in the locating opening 28 of the tool chuck 20. The O-rings are each inserted into annular grooves of the tool-holding device 50 and are held in position by said grooves. The holding element 56 is produced from an elastic material and can be compressed, for example, by the inserted tool 24 in such a way that the tool 24 can be inserted with its shank into the tool-locating region 52 and held elastically by the O-rings. In a similar manner, the holding element 56 in the connecting region 54 retains the tool-holding device 50 free of play and elastically in the locating opening 28.

A further tool-holding device 58 is shown in FIG. 5. This tool-holding device 58 is not inserted into the locating opening 28 of the tool chuck 20 but is put onto a tapered outer wall 60 of the tool chuck 20. To this end, the tool-holding device 58, in its connecting region 62, has a tapered inner wall 64 which is intended for arranging around the outer wall 60 of the tool chuck 20.

The outer wall 60 and the inner wall 64 are each ground and are designed to fit one another exactly, so that the tool-holding device 58 sits on the tool chuck 20 free of play and with only a slight risk of tilting. In this case, a tool-locating region 66, or tool-accommodating region, of the tool-holding device 58 is designed in such a way that the tool 24 held in it is oriented in alignment with the locating opening 28.

A holding element 68 in the form of a ball cage, which is shown in detail in FIG. 7, is arranged in the tool-locating region 66 of the tool-holding device 58. The holding element 68 has rows of rolling elements 70 in the form of balls arranged in a circle around the tool 24, rolling elements 70 which are adjacent in the tangential direction in each case being arranged offset in the axial direction 40 by slightly more than a ball radius. The rolling elements 70 are produced from steel and have slight but sufficient elasticity in order to hold the tool 24 elastically and free of play in the tool-locating region 66. When the tool 24 is inserted in the tool-locating region 66, the rolling elements 70 are elastically compressed by between 2 μm and 3 μm.

To insert the tool 24 into the tool-locating region 66 of the tool-holding device 58, first of all the holding element 68 is pressed into a tool-locating opening 76 of the tool-locating region 66 up to a stop 74 (FIG. 6), that is to say about halfway into said tool-locating opening 76. The tool 24 is then inserted with its shank into the holding element 68, the rolling elements 70 which project from the tool-locating opening 76 being pressed outward slightly in an elastic connecting means 72 holding the rolling elements 70 together.

When the tool shank is pressed further into the holding element 68, the topmost rolling elements 70 in the tool-locating opening 76 are pressed by the shank against the inner wall of the tool-locating opening 76 and, with further downward movement of the shank, are forced to roll on the inner wall. As a result, the connecting means 72 is drawn downward and into the tool-locating opening 76, the annular stop 74 being pressed radially inward. To permit this pressing-in of the stop 74, the connecting means 72 is produced from an elastic plastic (FIG. 8).

The tool 24 can now be pressed down to the tool chuck 20, the holding element 68 being inserted into the tool-locating opening 76 at half the speed of movement of the tool 24. Due to the central arrangement of the stop 74 in the axial direction 40, the holding element 68, when the tool shank is inserted completely into the tool-locating opening 76, is likewise arranged completely inside the tool-locating opening 76 and holds the tool 24 in a movable manner in the axial direction 40 and in the tangential direction and in a fixed manner in the radial direction; tilting is thus prevented.

Designations
 2 Setting and measuring apparatus
 4 Optical-system carrier
 6 Optical measuring system
 8 Control unit
 10 Induction slide
 12 Induction coil
 14 Tool-mounting spindle
 16 Evaluating unit
 18 Positioning means
 20 Tool chuck
 22 Tool-holding device
 24 Tool
 26 Connecting region
 28 Locating opening
 30 Locating region
 32 Tool-locating region
 34 Tool-locating opening
 36 Field of view
 36a Field of view
 38 Shank
 40 Axial direction
 42 Characteristic element
 46 Stop
 48 Positioning opening
 50 Tool-holding device
 52 Tool-locating region
 54 Connecting region
 56 Holding element
 58 Tool-holding device
 60 Outer wall
 62 Connecting region
 64 Inner wall
 66 Tool-locating region
 68 Holding element
 70 Rolling element
 72 Connecting means
 74 Stop
 76 Tool-locating opening
 $Z_{actual}$ Actual position
 $Z_{desired}$ Desired position
 $Z_\Delta$ Displacement distance

The invention claimed is:

1. A device including a tool, a tool chuck, and a tool-holding device for holding the tool on the tool chuck, prior to a heating of a locating region of the tool chuck and prior to an operation for shrink fitting the tool into the tool chuck, wherein the tool-holding device has a tool-accommodating region for accommodating at least a part of the tool, a connecting region for engaging the tool chuck, and a positioning opening, through which a positioning means, which is for positioning the tool, can be placed against the tool when at least the part of the tool is arranged in the tool accommodating region.

2. The device as claimed in claim 1, wherein the tool-accommodating region, when the tool chuck is arranged in the connecting region, holds the tool in alignment with a locating opening of the tool chuck.

3. The device as claimed in claim 1, wherein the connecting region has a shank that is adapted to fit in a locating opening of the tool chuck.

4. The device as claimed in claim 1, wherein a holding element provided for the elastic deformation is arranged in the connecting region and/or in the tool-accommodating region.

5. The device as claimed in claim 4, wherein the holding element comprises an O-ring.

6. The device as claimed in claim 4, wherein the holding element is a rolling-element cage.

7. The device as claimed in claim 1, wherein a movably mounted holding element is arranged in the connecting region and/or in the tool-accommodating region.

8. The device as claimed in claim 1, wherein the connecting region has an inner wall that is adapted to fit around an outer wall of the tool chuck.

9. The device as claimed in claim 8, wherein the inner wall is tapered.

10. The device as claimed in claim 1, wherein the tool is removed from the tool-holding device and the tool-holding device is removed from the tool chuck after a positioning process, and the tool is inserted into a locating opening of the tool chuck after a heating of a tool locating region of the tool chuck, wherein the heating starts said operation for shrink fitting of the tool into the tool chuck.

11. The device as claimed in claim 1, wherein the positioning means is guided with a top stop through a positioning opening in a connecting region of the tool-holding device until the stop abuts against a shank of the tool.

12. The device as claimed in claim 1, wherein the tool rests on the positioning means when the tool is held by the tool-accommodating region of the tool-holding device in a positioning process.

* * * * *